No. 649,579.  
C. E. JACKSON.  
CORN PLANTER.  
(Application filed Oct. 6, 1899.)  
Patented May 15, 1900.
(No Model.)  
2 Sheets—Sheet 1.
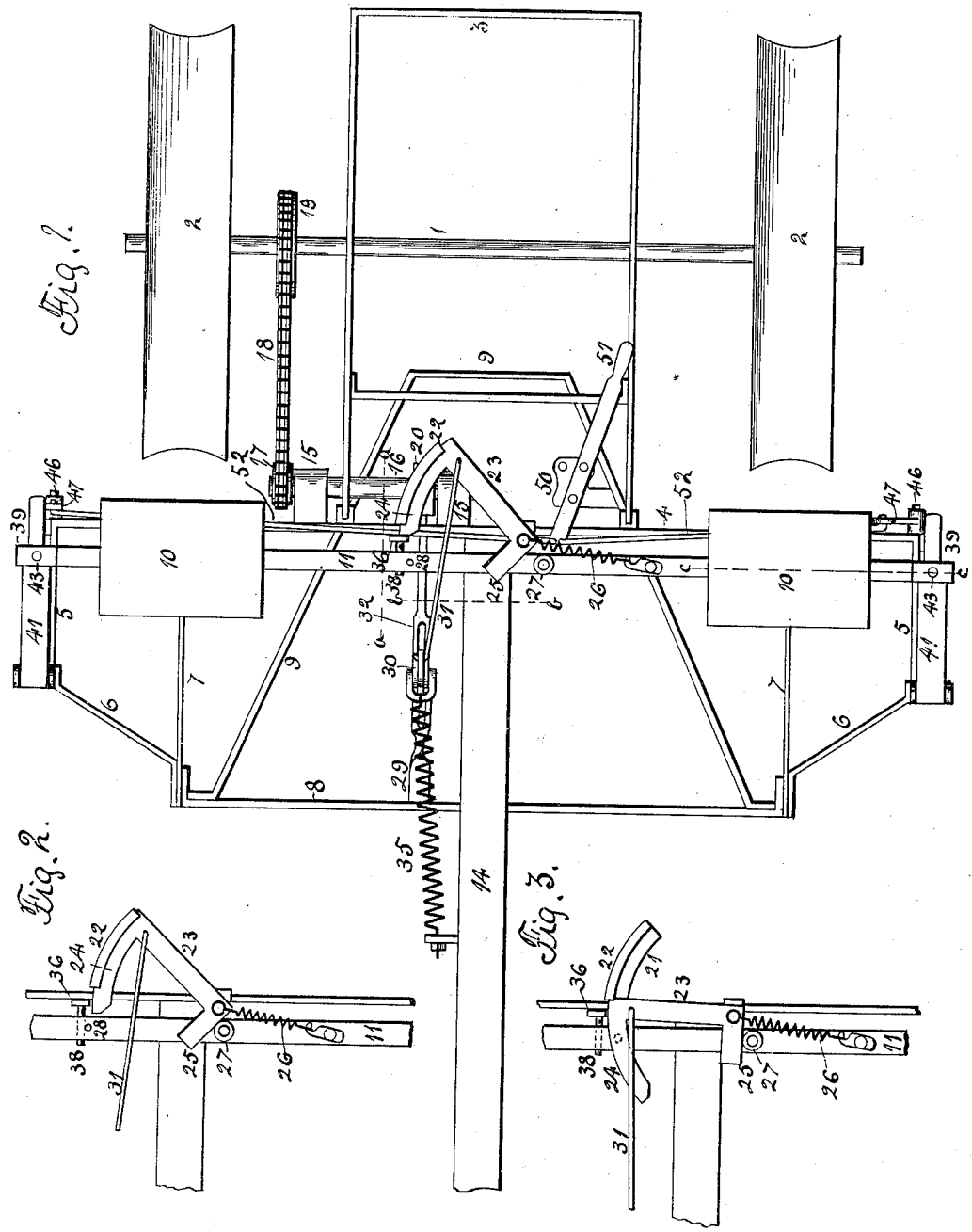
Witnesses:  
J. P. Taylor  
J. E. Behel
Inventor:  
Charles E. Jackson  
By A. O. Behel  
Atty No. 649,579.  
Patented May 15, 1900.
C. E. JACKSON.
CORN PLANTER.
(Application filed Oct. 6, 1899.)
(No Model.)  
2 Sheets—Sheet 2.
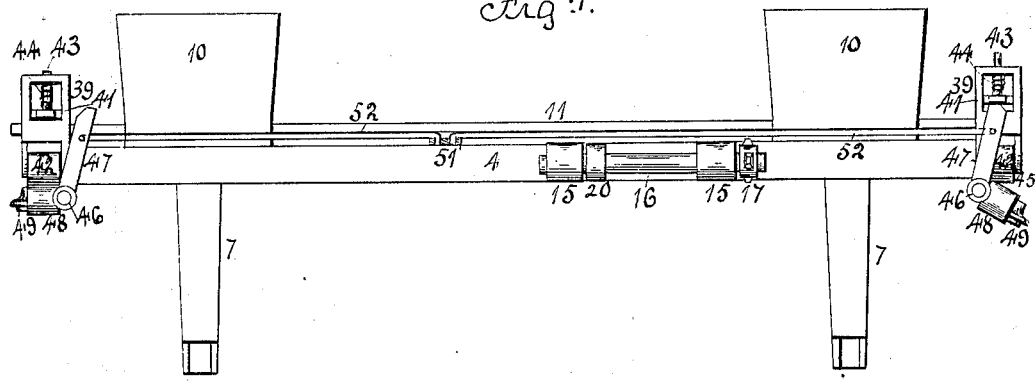
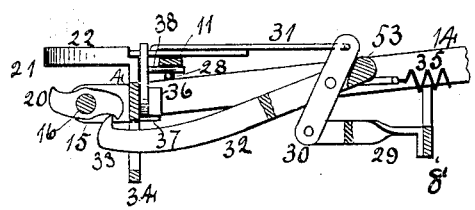
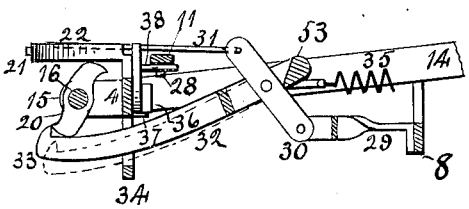
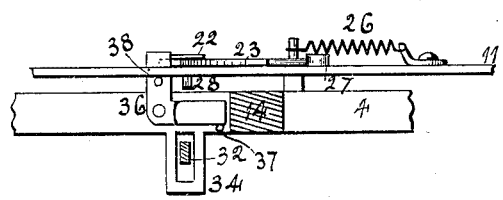
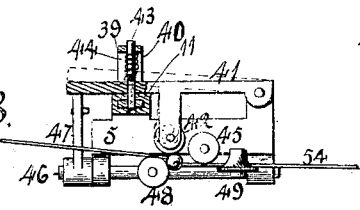
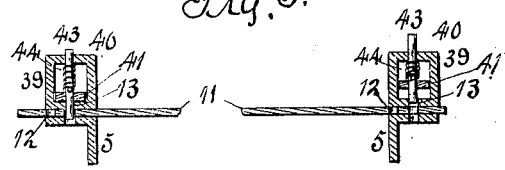
Witnesses:  
J. P. Taylor  
J. E. Dehel
Inventor:  
Charles E. Jackson  
By A. E. Dehel  
Atty.
THE NORRIS PETERS CO., PHOTO-LITHO., WASHINGTON, D. C.

UNITED STATES PATENT OFFICE.

CHARLES E. JACKSON, OF ROCKFORD, ILLINOIS.

CORN-PLANTER.

SPECIFICATION forming part of Letters Patent No. 649,579, dated May 15, 1900.

Application filed October 6, 1899. Serial No. 732,828. (No model.)

*To all whom it may concern:*

Be it known that I, CHARLES E. JACKSON, a citizen of the United States, residing at Rockford, in the county of Winnebago and State of Illinois, have invented certain new and useful Improvements in Corn-Planters, of which the following is a specification.

The object of this invention is to actuate the seed-slide by spring force, the spring force being accumulated by the supporting-wheels and liberated by a checking-wire.

In the accompanying drawings, Figure 1 is a plan view of a corn-planter embodying my improvements. Fig. 2 is a plan view of the spring arrangement in the position it occupies after the first check has taken place. Fig. 3 is a plan view of the spring arrangement in the position it occupies after the second check has taken place. Fig. 4 is an elevation of the runner-frame as seen from the rear. Figs. 5 and 6 are sections on dotted line $a$, Fig. 1, showing the means for storing spring-power. Fig. 7 is a section on dotted line $b$, Fig. 1. Fig. 8 is an end elevation of one of the trips for releasing the seed-slide; and Fig. 9 is a section on dotted line $c$, Fig. 1.

Upon the axle 1 are mounted the supporting-wheels 2, and a frame 3 is supported by the axle. The forward end of the frame is pivotally connected to a transverse bar 4, forming a part of the runner-frame, having its ends 5 bent forward and connected by braces 6 to the forward end of the runners or furrow-openers 7. A transverse brace 8 connects the forward ends of the runners, and to this brace is connected a frame 9, extending rearward beyond the pivotal connection between the runner-frame and wheel-frame.

Seedboxes 10 are supported by the runner-frame, and a seed-slide 11 actuates the seed cups and valves in the boxes, which I have not deemed necessary to show. Each end of the seed-slide has two vertical holes 12 and 13. A tongue 14 is connected to the runner-frame in any suitable manner.

To the rear face of the bar 4 are secured two brackets 15, which support a shaft 16 in a manner to permit it to revolve. Upon one end of this shaft is located and secured a sprocket-wheel 17, and a linked driving-chain 18 connects this sprocket-wheel with a sprocket-wheel 19, secured to the axle 1, so that as the supporting-wheels 2 revolve its motion will be imparted to the shaft 16. To this shaft 16 is secured a two-armed bar 20, having its ends in hook form. A curved bracket 21 is supported by the bar 4 and has an overlapping portion 22 at its outer edge. An arm 23 has a pivotal connection with the bar 4 and has one end 24 curved and its other end 25 bent at right angles thereto and overlying the seed-slide. A spring 26 connects the seed-slide and pivot of the arm 23. A roller 27 is located on the upper face of the seed-slide, and a pin 28 depends from its under face. To the under face of the bar 8 of the runner-frame is secured a bracket 29, and to its free end is pivoted an arm 30. The upper end of this arm has a connection with the arm 23 by a link 31. To the center portion of this arm is pivoted an arm 32, its free rear end 33 being in hook form and guided in the loop 34, depending from the lower edge of the bar 4. A coiled spring 35 has a connection with the center of the arm 30 and with the tongue 14.

To the front face of the bar 4 is pivoted a bell-crank lever 36, Fig. 1, having its horizontal arm weighted, and a stop 37 limits the downward movement of the horizontal arm. A pin 38 extends forward from the vertical arm of the bell-crank lever. The forward end extension 5 of the bar 4 supports means which are operated by the check-wire, both ends supporting similar means. To each end extension is secured a bracket 39, through which the end of the seed-slide passes and is guided. The upper portion of the brackets have an opening 40. To the forward end of the end extensions is pivoted an arm 41, its rear end guided in the opening 40. A roller 42 is supported by the arm 41 about midway of its length. A rod 43 is guided in vertical openings in the bracket 39 and passes through the rear end of the arm 41. A pin passes through the rod 43 just above the arm 41, and a coiled spring 44 surrounds the rod between the pin and the upper end of the bracket 39, so that the pressure of the spring will be downward on the pivoted arm 41. A roller 45 is supported by the end extensions in advance of the roller 42, supported by the pivoted arm 41. A rock-shaft 46 is supported by the end extension and to the rear end is rigidly secured an arm 47, its upper end being beveled. This rock-shaft supports a roller 48, revolving on a horizontal pivot and located at the rear of the roller 42, and supports the knot on the wire in passing between the rollers 42 and 48, and will raise the pivoted arm 41, sufficient to raise the rod 43 clear of the hole in the seed-slide, and after the knot has passed the arm will descend.

As the machine passes over the ground a rotary movement will be imparted to the two-armed bar 20, and when the parts are in the position shown at Figs. 3 and 5 the closed end 53 of the arm 32 will rest in contact with the front edge of the arm 30, which will hold the hooked end 33 of the arm 32 in the path of the revolving two-armed bar 20, and the hooked end of the bar will engage the hooked end of the arm, and as it revolves it will move the arm rearward against the action of the spring 35 until it assumes the position shown at Fig. 6, and when the revolving bar becomes disengaged from the arm the arm will drop into the position shown in dotted lines, Fig. 6. When the arm 32 is moved bodily rearward, it will move the arm 30 on its pivotal connection with the bracket 29, and its upper end will move rearward and through the link 31. The arm 23 is moved on its pivot until it assumes the position shown at Fig. 1. The pivoted bell-crank lever 36 by reason of its weighted end will fall in the path of the curved arm 24, so that when the arm 32 has become disengaged from the bar 20 the force of the spring 35 will move the curved end 24 of the arm 23 against the vertical end of the bell-crank lever, thereby forming a stop.

The seed-slide is held against movement by the rod 43, at the left-hand end of the machine, passing through the vertical opening 13 in the slide and into the vertical opening in the bracket 39. The rod 43, at the right-hand end of the machine, is held above the seed-slide by the arm 47 at that end holding the pivoted bar 41 elevated, while the arm 47, at the left-hand end of the machine, is out of the path of the movement of the pivoted arm 41 at that end. It will be noticed at Figs. 4 and 9 the seed-slide is at the end of its movement to the left hand and that the spring 26 is extended. If the knot of the checking-wire should raise the roller 42 and pivoted arm 41 at the left-hand side of the machine sufficient to clear the rod of the hole in the seed-slide, the seed-slide would be moved lengthwise to the right hand by the action of the spring 26 until the hole 12 in the seed-slide comes under the rod, when the rod will drop into the hole and hold the slide from further movement, and this movement of the slide will cause a hill of corn to be dropped from both seedboxes, will also carry the roller 27 near to the end 25 of the arm 23, and the pin 28, depending from the under face of the seed-slide, will engage the pin 38, extending from the bell-crank lever and will move the bell-crank lever sufficiently to release the pivotal arm 23, when it will assume the position shown at Fig. 2. Upon the next knot of the checking-wire raising the rod 43 free of the seed-slide the spring 35 will move the arm 23 through the link 31, and its end 25 will move in contact with the roller 27 and move the seed-slide into its original position, when the parts will appear as shown at Figs. 3 and 5, and the rod 43 will drop into the opening in the seed-slide and hold it from moving. As before stated, the two-armed bar 20 is constantly rotating, and this last movement of the spring 35 will move the arm 30 into the position shown at Fig. 5, and the closed end 53 of the arm 32 will hold the hooked end of the arm in the path of the movement of the two-armed bar 20, which will move the parts into the position shown at Figs. 1 and 6, which are held against the action of the spring 35 by the bell-crank lever acting as a stop to the arm 23. When the spring 35 moves the seed-slide 11 to the left-hand end of the machine, it causes the spring 26 to be extended. Two complete checking movements are made each time the power is stored in the springs and about one-fourth turn of the two-armed bar is necessary to store up the spring-power, and this is accomplished at about eight inches travel of the supporting-wheels.

At Fig. 4 it will be seen that the rollers 48 and 49, supported by the rock-shaft 46 at the left-hand end of the machine, are held in position, so that the knot of the checking-wire can raise the rod 43, while the like rollers at the right-hand end of the machine are dropped. By means of the hand-lever 51, pivotally connected to a bracket 50, having a connection with the arms 47 by the links 52, the rollers 48 and 49 at the right hand of the machine may be raised and those at the left-hand end dropped, and the rod 43 at the end of the machine in which the rollers are dropped is held free of the seed-slide, and in dropping the rollers the checking-wire is liberated and the other rollers placed in position to receive the wire, and it will be noticed that the rod in engagement with the seed-slide is not raised therefrom by the arms 47 until the rod at the other end of the machine has engaged the seed-slide. This is necessary in order that the seed-slide will be held against movement when relieved of the checking-wire.

I claim as my invention—

1. In a corn-planter, the combination of seed-dropping mechanism, spring-power for operating the seed-dropping mechanism, the spring-power released by the action of a checking-wire.

2. In a corn-planter, the combination of seed-dropping mechanism, spring-power stored by the supporting-wheels for operating the seed-dropping mechanism, the spring-power released by the action of a checking-wire.

3. In a corn-planter, the combination of seed-dropping mechanism, spring-power for operating the seed-dropping mechanism, means for storing spring-power and means for releasing the spring-power in a series of impulses.

4. In a corn-planter, the combination of seed-dropping mechanism, spring-power for operating the seed-dropping mechanism, means for storing spring-power and means for releasing the spring-power in a series of impulses by the action of a checking-wire.

5. In a corn-planter, the combination of a seed-slide, a spring for moving the slide in one direction and a second spring for moving it in the opposite direction, a connection between the second spring and supporting-wheels and means for releasing the spring-power in a series of impulses.

6. In a corn-planter, the combination of a seed-slide, a spring for moving the slide in one direction and a second spring for moving it in the opposite direction, means for storing power in the second spring and the second spring storing power in the first spring, and means for releasing the spring-power in a series of impulses.

7. In a corn-planter, the combination of a seed-slide, spring-power for moving the slide, means holding the slide against movement at each end of its stroke and means for releasing the slide.

8. In a corn-planter, the combination of a seed-slide, a lever for moving the slide, a spring connected with the lever, a stop for the lever, means for moving the stop to free the lever, means for storing spring-power and liberating it.

9. In a corn-planter, the combination of a seed-slide, a roller mounted thereon, a pivoted lever adapted to engage the roller, a spring connected at one end with a stationary support and its other end with the seed-slide, a movable stop for the lever, a spring connection between the lever and stationary support, and means for releasing the seed-slide.

10. In a corn-planter, the combination of a seed-slide, a roller mounted thereon, a pin depending therefrom, a pivoted lever having one end overlying the seed-slide and its other end curved, a spring connected at one end with a stationary support and its other end with the seed-slide, a stop for the lever and moved by the pin, a spring connection between the lever and stationary support, and means for releasing the seed-slide.

11. In a corn-planter, the combination of a seed-slide, a rotating head, a lever adapted to engage the head and be moved bodily thereby, a spring having power stored therein by the movement of the lever and a connection between the spring and seed-slide.

12. In a corn-planter, the combination of a seed-slide, spring-power for moving the slide, means for holding the slide against movement and means for releasing the slide operated upon by a checking-wire.

13. In a corn-planter, the combination of seed-dropping mechanism, spring-power for operating the seed-dropping mechanism, means for holding the seed-dropping mechanism against movement, and means located at each side of the machine capable of releasing the seed-dropping mechanism by the action of a checking-wire.

14. In a corn-planter, the combination of seed-dropping mechanism, spring-power for operating the seed-dropping mechanism, means for holding the seed-dropping mechanism against movement, means located at each side of the machine for releasing the seed-dropping mechanism, consisting of a movable bar supporting the releasing device which is operated upon by a checking-wire.

15. In a corn-planter, the combination of seed-dropping mechanism, spring-power for operating the seed-dropping mechanism, means for holding the seed-dropping mechanism against movement, means located at each side of the machine for releasing the seed-dropping mechanism consisting of a movable bar supporting the releasing device which is operated upon by a checking-wire, a hand-lever, a pivoted lever for each movable bar and a connection between the levers and hand-lever.

16. In a corn-planter, the combination of seed-dropping mechanism, means for moving the seed-dropping mechanism, means for preventing the movement of the seed-dropping mechanism by the action of a checking-wire, consisting of a movable bar located at each side of the machine supporting the releasing device, a rock-shaft at each side of the machine supporting two rollers, a hand-lever and a connection between the rock-shafts and the hand-lever.

CHARLES E. JACKSON.

Witnesses:
O. B. COX,
A. O. BEHEL.